(12) United States Patent  
Earhart

(10) Patent No.: US 7,798,931 B2  
(45) Date of Patent: Sep. 21, 2010

(54) MULTI-SPEED SPLIT DUAL CLUTCH TRANSMISSION

(76) Inventor: David Earl Earhart, 8240 E. County Rd. 300 North, Brownsburg, IN (US) 46112

( * ) Notice: Subject to any disclaimer, the term of this patent is extended or adjusted under 35 U.S.C. 154(b) by 323 days.

(21) Appl. No.: 12/028,447

(22) Filed: Feb. 8, 2008

(65) Prior Publication Data  
US 2009/0203484 A1 Aug. 13, 2009

(51) Int. Cl.  
*F16H 3/44* (2006.01)
(52) U.S. Cl. .................................................. 475/207
(58) Field of Classification Search .................. 475/207  
See application file for complete search history.

(56) References Cited

U.S. PATENT DOCUMENTS

| 7,128,681 | B2 * | 10/2006 | Sugino et al. | 475/218 |
| 2009/0036247 | A1 * | 2/2009 | Earhart et al. | 475/35 |
| 2009/0203482 | A1 * | 8/2009 | Earhart | 475/207 |
| 2009/0203483 | A1 * | 8/2009 | Earhart | 475/207 |

* cited by examiner

*Primary Examiner*—Dirk Wright

(57) ABSTRACT

A transmission is provided having an input member, an output member, a clutch assembly, two countershaft gearing arrangements, one planetary gear set, a plurality of interconnecting members, and a plurality of torque transmitting devices. Each of the countershaft gearing arrangements includes a plurality of co-planar gear sets. The torque transmitting devices include a combination of clutches, brakes, and synchronizers.

25 Claims, 2 Drawing Sheets

_US 7,798,931 B2_

MULTI-SPEED SPLIT DUAL CLUTCH TRANSMISSION

FIELD

Figure 1:
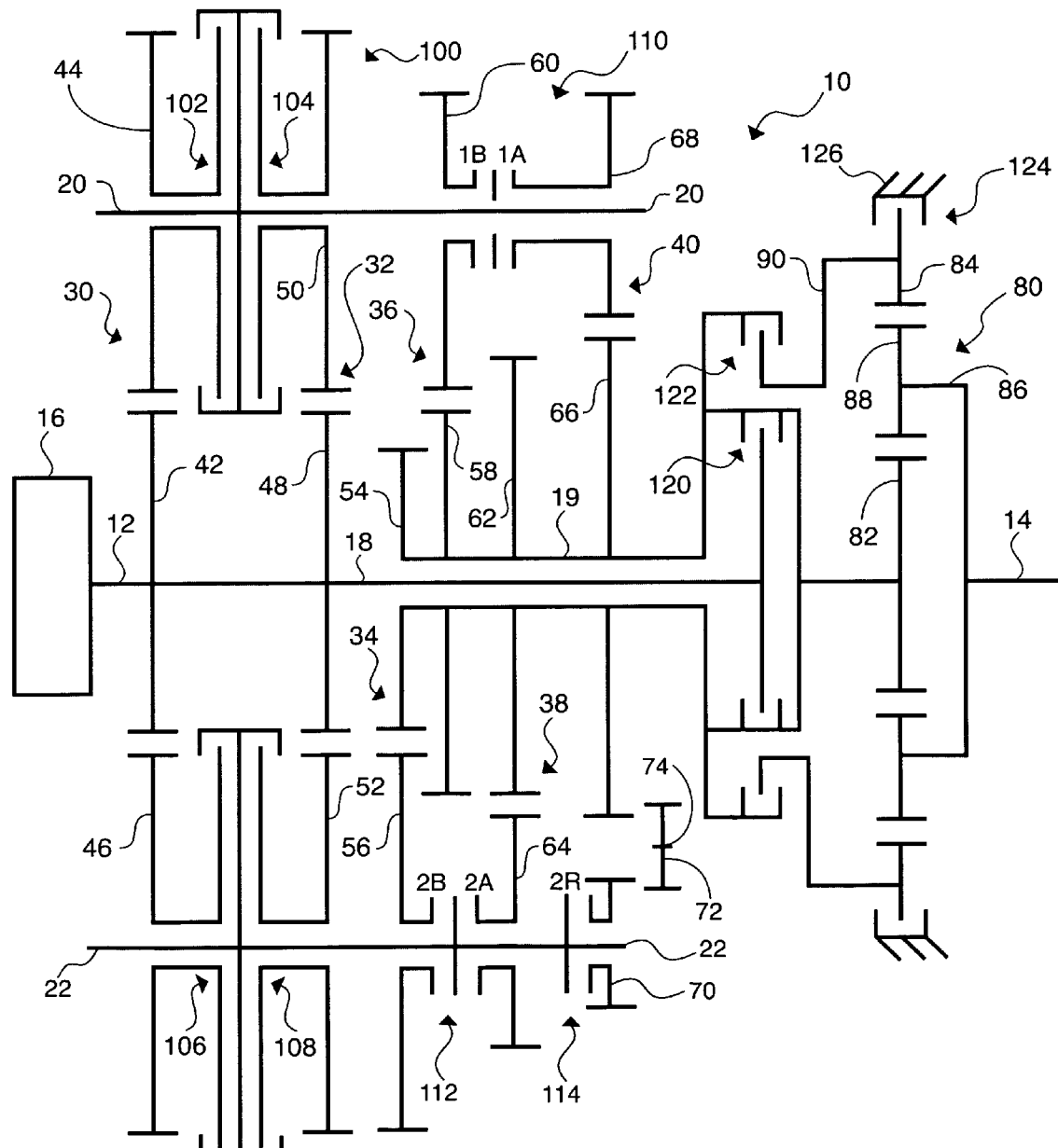

The present disclosure relates to transmissions, and more particularly to a multiple speed split dual clutch transmission having dual countershafts.

BACKGROUND

The statements in this section merely provide background information related to the present disclosure and may or may not constitute prior art.

A typical multi-speed, dual clutch transmission employs a plurality of clutches to achieve a plurality of forward and reverse gear ratios. These dual clutch transmissions are typically employed in front-wheel drive applications. Additionally, a slipping clutch is employed to transmit launch torque from an engine to the transmission in order to achieve a high power-to-weight ratio that is desirable in non-commercial vehicles.

While useful for its intended purpose, these conventional multi-speed dual clutch transmissions do not have the range of torque and available gear ratios necessary to be employed in commercial vehicles or trucks. Additionally, the addition of clutches, brakes, and gear sets to achieve these gear ratios and torque ranges may result in inefficient or undesirable transmission weights and sizes. Accordingly, there is a need in the art for a transmission having improved packaging while providing desirable gear ratios and torque ranges.

SUMMARY

The present invention provides a transmission having an input member, an output member, a split dual clutch assembly, two countershaft gearing arrangements, one planetary gear set, a plurality of interconnecting members, and a plurality of torque transmitting devices. Each of the countershaft gearing arrangements includes a plurality of co-planar gear sets. The torque transmitting devices include a combination of clutches, brakes, and synchronizers.

In one aspect of the present invention the torque transmitting devices include six clutches, one brake, and three synchronizers to provide at least seventeen forward gear ratios.

In another aspect of the present invention the torque transmitting devices include five clutches, one brake, and three synchronizers to provide at least sixteen forward gear ratios.

In still another aspect of the present invention the countershafts are radially outward from and parallel to the input member.

In still another aspect of the present invention the planetary gear set is co-axial with the input member.

In still another aspect of the present invention the transmission includes a torque converter continuously connected with the input member.

In still another aspect of the present invention the split dual clutch assembly includes a first and second clutch for selectively connecting the input member with a first countershaft and a third and fourth clutch for selectively connecting the input member with a second countershaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
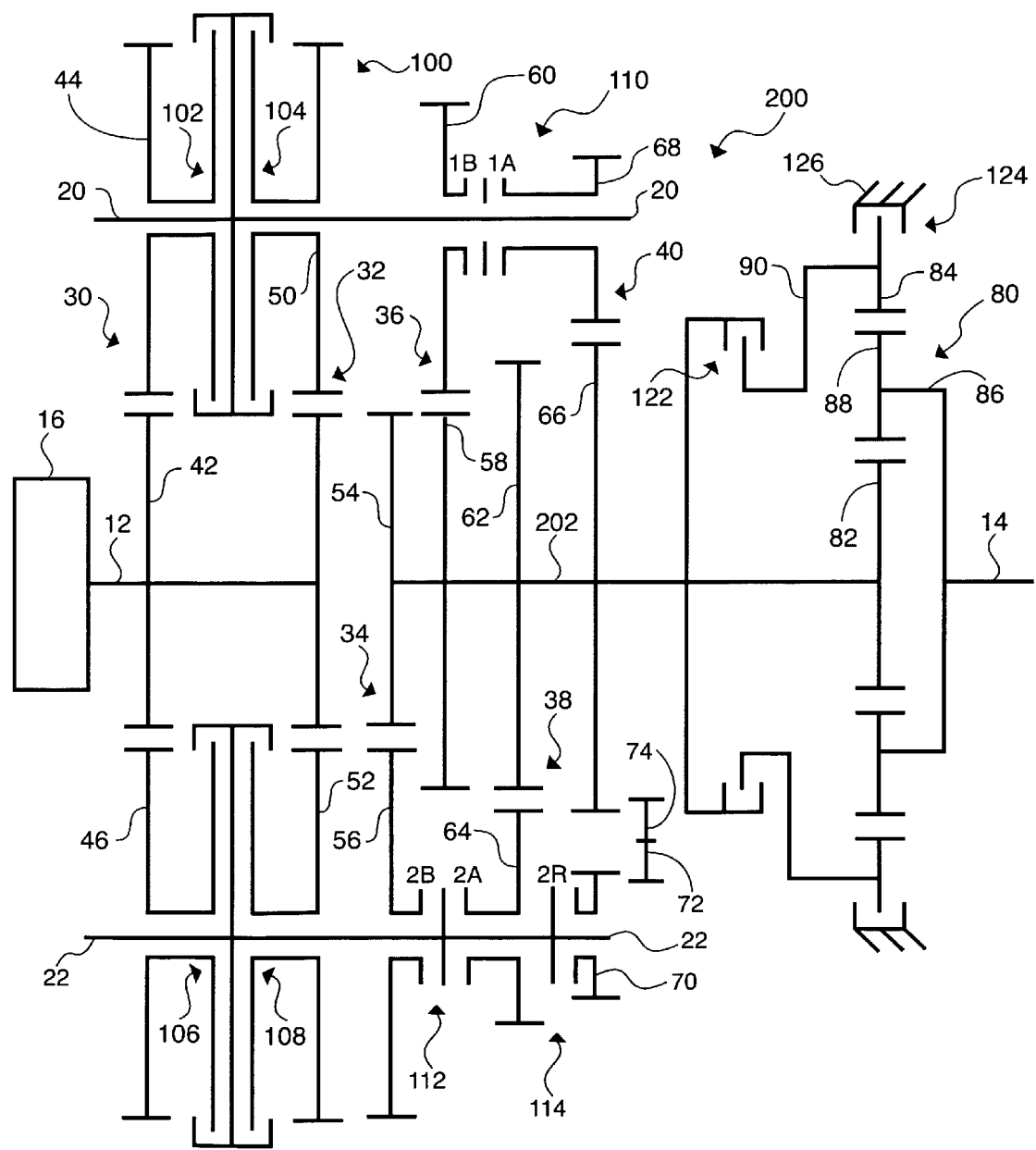

FIG. 1 is a diagrammatic view of a seventeen speed embodiment of a transmission according to the principles of the present invention; and FIG. 2 is a diagrammatic view of a sixteen speed embodiment of the transmission according to the principles of the present invention.

DETAILED DESCRIPTION

The following description is merely exemplary in nature and is not intended to limit the present disclosure, application, or uses.

With reference to FIG. 1, a stick diagram presents a schematic layout of a multi-speed transmission for use in a motor vehicle, generally indicated by reference number 10. The transmission 10 is preferably a longitudinal split dual clutch transmission. The transmission 10 includes an input shaft or member 12 and an output shaft or member 14. Those skilled in the art will appreciate that the input and output members 12, 14 may be components other than shafts without departing from the scope of the present invention. In the example provided, the input member 12 is continuously connected to a turbine of a torque converter 16. The output member 14 is continuously connected with a final drive unit or transfer case (not shown) in the motor vehicle.

The transmission 10 further includes interconnecting shafts, countershafts, co-planar intermeshing gear sets, and selectively engagable synchronizers and clutches as will be described herein. For example, the transmission 10 includes a first shaft or interconnecting member 18, a second shaft or interconnecting member 19, a first layshaft or countershaft 20, and a second layshaft or countershaft 22. The first interconnecting member 18 is rotatingly coupled to the input member 12. The second interconnecting member 19 is preferably a sleeve shaft that is at least partially coaxial with the first interconnecting member 18. The countershafts 20, 22 are both spaced radially outward from and parallel with the input member 12, the output member 14, and the interconnecting members 18, 19.

The transmission 10 includes a plurality of co-planar or spur gear sets including a first gear set 30, a second gear set 32, a third gear set 34, a fourth gear set 36, a fifth gear set 38, and a sixth gear set 40. The first gear set 30 includes a gear 42, a gear 44, and a gear 46. Gear 42 is connected for common rotation with the input shaft 12 and intermeshed with gear 44 and gear 46. Gear 44 is rotatable about and selectively connectable with the first countershaft 20. Gear 46 is rotatable about and selectively connectable with the second countershaft 22.

The second gear set 32 includes a gear 48, a gear 50, and a gear 52. Gear 48 is connected for common rotation with the input member 12 and the first interconnecting member 18 and is intermeshed with gear 50 and gear 52. Gear 50 is rotatable about and selectively connectable with the first countershaft 20. Gear 52 is rotatable about and selectively connectable with the second countershaft 22.

The third gear set 34 includes a gear 54 and a gear 56. Gear 54 is connected for common rotation with the second interconnecting member 19 and is intermeshed with gear 56. Gear 56 is rotatable about and selectively connectable with the second countershaft 22.

The fourth gear set 36 includes a gear 58 and a gear 60. Gear 58 is connected for common rotation with the second interconnecting member 19 and is intermeshed with gear 60. Gear 60 is rotatable about and selectively connectable with the first countershaft 20.

The fifth gear set 38 includes a gear 62 and a gear 64. Gear 62 is connected for common rotation with the second interconnecting member 19 and is intermeshed with gear 64. Gear 64 is rotatable about and selectively connectable with the second countershaft 22.

The sixth gear set 40 includes a gear 66, a gear 68, and a gear 70. Gear 66 is connected for common rotation with the second interconnecting member 19 and is intermeshed with gear 68 and an idler gear 72. Gear 68 is rotatable about and selectively connectable with the first countershaft 20. The idler gear 72 is connected for common rotation with an independent shaft or pinion 74. The idler gear 72 is intermeshed with gear 70. Gear 70 is rotatable about and selectively connectable with the second countershaft 22.

The transmission 10 further includes a high/low splitter gear set 80 located between the members 12, 18, and 19 and the output shaft 14. The splitter gear set 80 is preferably a simple planetary gear set having a sun gear member 82, a ring gear member 84, and a planet carrier member 86 which rotatably supports a set of pinion gears 88 which intermesh with both the sun gear member 82 and the ring gear member 84. The sun gear member 82 is connected for common rotation with the second interconnecting member 19. The ring gear member 84 is connected for common rotation with a third shaft or interconnecting member 90. The planet carrier member 86 is connected for common rotation with the output member 14.

The transmission 10 also includes a split dual clutch assembly 100 for selectively coupling the input member 12 to one of the first and second countershafts 20, 22. More specifically, the split dual clutch assembly 100 includes a first clutch 102, a second clutch 104, a third clutch 106, and a fourth clutch 108. The first clutch 102 is selectively engageable to connect gear 44 of the first gear set 30 with the first countershaft 20. The second clutch 104 is selectively engageable to connect gear 50 of the second gear set 32 with the first countershaft 20. The third clutch 106 is selectively engageable to connect gear 46 of the first gear set 30 with the second countershaft 22. The fourth clutch 108 is selectively engageable to connect gear 52 of the second gear set 32 with the second countershaft 22. In the example provided, the first and third clutches 102, 106 are coplanar and radially offset from the input member 12 and the second and fourth clutches 104, 108 are coplanar and radially offset from the input member 12. However, it should be appreciated that the clutches 102, 104, 106, 108 may be in various other positions relative to one another without departing from the scope of the present invention.

A plurality of coupling mechanisms including a first synchronizer 110, a second synchronizer 112, and a third synchronizer 114 allow for selective interconnection of the gears 56, 60, 64, 68, and 70 with the countershafts 20, 22. The synchronizers 110, 112, 114 generally include a shift fork (not shown) that is bi-directionally translated by an actuator (not shown) into at least two engaged positions and a neutral or disengaged position. For example, the first synchronizer 110 may be translated to the left (position 1B in FIG. 1) to synchronize the speed of the first countershaft 20 with the speed of gear 60 and couple it thereto or moved to the right (position 1A in FIG. 1) to synchronize the speed of the first countershaft 20 with the speed of gear 68 and couple it thereto. The second synchronizer 112 may be translated to the left (position 2B in FIG. 1) to synchronize the speed of the second countershaft 22 with the speed of gear 56 and couple it thereto or moved to the right (position 2A in FIG. 1) to synchronize the speed of the second countershaft 22 with the speed of gear 64 and couple it thereto. The third synchronizer 114 may be translated to the right (position 2R in FIG. 1) to synchronize the speed of the second countershaft 22 with the speed of gear 70 and couple it thereto.

A plurality of torque-transmitting devices including a fifth clutch 120, a sixth clutch 122, and a brake 124 allow for selective interconnection of the interconnecting members 18, 19, 90 with the members of the high/low splitter gear set 80 and a ground, stationary element, or a transmission housing 126. For example, the fifth clutch 120 is selectively engageable to connect the first interconnecting member 18 with the second interconnecting member 19. The sixth clutch 122 is selectively engageable to connect the second interconnecting member 19 with the third interconnecting member 90. The brake 124 is selectively engageable to connect the third interconnecting member 90 and the ring gear member 84 with a ground or the transmission housing 126 in order to restrict the ring gear member 84 from rotating relative to the ground or the transmission housing 126. The clutches 120, 122 and the brake 124 are preferably hydraulically actuated friction clutches as is known in the art. Additionally, the fifth clutch 120 is preferably concentric with the sixth clutch 122 and radially inward therefrom in order to reduce the size of the transmission 10.

It will be appreciated that the transmission 10 is capable of transmitting torque from the input member 12 to the output member 14 in at least seventeen forward speed or torque ratios and at least four reverse speed or torque ratios. Each forward and reverse speed or torque ratio is attained by engagement of one or more of the torque-transmitting devices (i.e. first synchronizer 110, second synchronizer 112, third synchronizer 114, first clutch 102, second clutch 104, third clutch 106, fourth clutch 108, fifth clutch 120, sixth clutch 122, and brake 124), as will be explained below. Chart 1 is a truth table presenting the various combinations of torque-transmitting devices that are activated or engaged to achieve the various gear states. In the particular example provided, "1A", "1B", "2A", "2B", and "2R" refer to the positions of the synchronizers 110, 112, 114 as described above and illustrated in FIG. 1. A blank in the column of the synchronizers 110, 112, 114 indicates that the synchronizers 110, 112, 114 may be in any position, including a neutral or disengaged position. An "X" indicates that the torque transmitting element is engaged or activated for the given speed ratio.

CHART 1

| | TORQUE TRANSMITTING ELEMENTS | | | | | | | | | |
|---|---|---|---|---|---|---|---|---|---|---|
| Speed Ratio | 102 | 104 | 106 | 108 | 120 | 124 | 122 | 110 | 112 | 114 |
| 1 | X | | | | | X | | 1A | | |
| 2 | | X | | | | X | | | 2A | |
| 3 | | | X | | | X | | 1B | | |
| 4 | | | | X | | X | | | 2B | |
| 5 | X | | | | | X | | 1A | | |

CHART 1-continued

| Speed Ratio | TORQUE TRANSMITTING ELEMENTS | | | | | | | | | |
|---|---|---|---|---|---|---|---|---|---|---|
| | 102 | 104 | 106 | 108 | 120 | 124 | 122 | 110 | 112 | 114 |
| 6  |   |   | X |   |   | X |   |    | 2A |    |
| 7  |   | X |   |   |   | X |   | 1B |    |    |
| 8  |   |   |   | X |   | X |   |    | 2B |    |
| 9  | X |   |   |   |   |   | X | 1A |    |    |
| 10 |   |   | X |   |   |   | X |    | 2A |    |
| 11 |   | X |   |   |   |   | X | 1B |    |    |
| 12 |   |   |   | X |   |   | X |    | 2B |    |
| 13 | X |   |   |   |   |   | X | 1A |    |    |
| 14 |   |   | X |   |   |   | X |    | 2B |    |
| 15 |   | X |   |   |   |   | X | 1A |    |    |
| 16 |   |   |   |   | X |   |   |    |    |    |
| 17 |   |   |   | X |   |   | X |    | 2B |    |
| R1 |   | X |   |   |   | X |   |    |    | 2R |
| R2 |   |   | X |   |   | X |   |    |    | 2R |
| R3 |   | X |   |   |   |   | X |    |    | 2R |
| R4 |   |   | X |   |   |   | X |    |    | 2R |

For example, to establish first gear, the first clutch 102 and the brake 124 are engaged or activated and the first synchronizer 110 is in the 1A position. Likewise, the reverse gears and the seventeen forward ratios are achieved through different combinations of clutch and brake engagement and synchronizer position, as shown in Chart 1.

Chart 2 is a truth table presenting an alternate embodiment of the various combinations of torque-transmitting devices that are activated or engaged to achieve the various gear states. In the particular example provided, "1A", "1B", "2A", "2B", and "2R" refer to the positions of the synchronizers 110, 112, 114 as described above and illustrated in FIG. 1. A blank in the column of the synchronizers 110, 112, 114 indicates that the synchronizers 110, 112, 114 may be in any position, including a neutral or disengaged position. An "X" indicates that the torque transmitting element is engaged or activated for the given speed ratio.

and the seventeen forward ratios are achieved through different combinations of clutch and brake engagement and synchronizer position, as shown in Chart 2.

Turning now to FIG. 2, an alternate embodiment of the transmission 10 is shown and generally indicated by reference number 200. The transmission 200 is similar to the transmission 10 and accordingly like parts are indicated by like reference numbers. However, the transmission 200 does not include the fifth clutch 120. Additionally, the first interconnecting member 18 and the second interconnecting member 19 have been replaced by a fourth shaft or interconnecting member 202. The fourth interconnecting member 202 is coupled for common rotation with the gears 54, 58, 62, 66, the sixth clutch 122, and the sun gear 82. Additionally, the fourth interconnecting member 202 is not directly coupled to the input member 12.

CHART 2

| Speed Ratio | TORQUE TRANSMITTING ELEMENTS | | | | | | | | | |
|---|---|---|---|---|---|---|---|---|---|---|
| | 102 | 104 | 106 | 108 | 120 | 124 | 122 | 110 | 112 | 114 |
| 1  | X |   |   |   |   | X |   | 1A |    |    |
| 2  |   | X |   |   |   | X |   | 1A |    |    |
| 3  |   |   | X |   |   | X |   |    | 2A |    |
| 4  |   |   |   | X |   | X |   |    | 2A |    |
| 5  | X |   |   |   |   | X |   | 1B |    |    |
| 6  |   | X |   |   |   | X |   | 1B |    |    |
| 7  |   |   | X |   |   | X |   |    | 2B |    |
| 8  |   |   |   | X |   | X |   |    | 2B |    |
| 9  | X |   |   |   |   |   | X | 1A |    |    |
| 10 |   | X |   |   |   |   | X | 1A |    |    |
| 11 |   |   | X |   |   |   | X |    | 2A |    |
| 12 |   |   |   | X |   |   | X |    | 2A |    |
| 13 | X |   |   |   |   |   | X | 1B |    |    |
| 14 |   | X |   |   |   |   | X | 1B |    |    |
| 15 |   |   | X |   |   |   | X |    | 2B |    |
| 16 |   |   |   |   | X |   |   |    |    |    |
| 17 |   |   |   | X |   |   | X |    | 2B |    |
| R1 |   | X |   |   |   | X |   |    |    | 2R |
| R2 |   |   | X |   |   | X |   |    |    | 2R |
| R3 |   | X |   |   |   |   | X |    |    | 2R |
| R4 |   |   | X |   |   |   | X |    |    | 2R |

For example, to establish first gear, the first clutch 102 and the brake 124 are engaged or activated and the first synchronizer 110 is in the 1A position. Likewise, the reverse gears The transmission 200 is a 16-speed transmission with overdrive and is operable to provide at least 16 forward speed or torque ratios and at least four reverse speed or torque ratios.

Chart 3 is a truth table presenting the various combinations of the torque-transmitting devices that are activated or engaged to achieve the sixteen forward speed or torque ratios and the four reverse speed or torque ratios in the 16-speed transmission 200. In the particular example provided, "1A", "1B", "2A", "2B", and "2R" refer to the positions of the synchronizers 110, 112, 114 as described above and illustrated in FIG. 2. A blank in the column of the synchronizers 110, 112, 114 indicates that the synchronizers 110, 112, 114 may be in any position, including a neutral or disengaged position. An "X" indicates that the torque transmitting element is engaged or activated for the given speed ratio.

CHART 3

| Speed Ratios | 102 | 104 | 106 | 108 | 124 | 122 | 110 | 112 | 114 |
|---|---|---|---|---|---|---|---|---|---|
| 1 | X | | | | X | | 1A | | |
| 2 | | X | | | X | | 1A | | |
| 3 | | | X | | X | | | 2A | |
| 4 | | | | X | X | | | 2A | |
| 5 | X | | | | X | | 1B | | |
| 6 | | X | | | X | | 1B | | |
| 7 | | | X | | X | | | 2B | |
| 8 | | | | X | X | | | 2B | |
| 9 | X | | | | | X | 1A | | |
| 10 | | X | | | | X | 1A | | |
| 11 | | | X | | | X | | 2A | |
| 12 | | | | X | | X | | 2A | |
| 13 | X | | | | | X | 1B | | |
| 14 | | X | | | | X | 1B | | |
| 15 | | | X | | | X | | 2B | |
| 16 | | | | X | | X | | 2B | |
| R1 | | X | | X | | | | | 2R |
| R2 | | | X | X | | | | | 2R |
| R3 | | X | | | | X | | | 2R |
| R4 | | | | X | | X | | | 2R |

For example, to establish first gear, the first clutch 102 and the brake 124 are engaged or activated and the first synchronizer 110 is in the 1A position. Likewise, the reverse gears and the sixteen forward ratios are achieved through different combinations of clutch and brake engagement and synchronizer position, as shown in Chart 3.

Chart 4 is a truth table presenting an alternate embodiment of the various combinations of torque-transmitting devices that are activated or engaged to achieve the various gear states. In the particular example provided, "1A", "1B", "2A", "2B", and "2R" refer to the positions of the synchronizers 110, 112, 114 as described above and illustrated in FIG. 2. A blank in the column of the synchronizers 110, 112, 114 indicates that the synchronizers 110, 112, 114 may be in any position, including a neutral or disengaged position. An "X" indicates that the torque transmitting element is engaged or activated for the given speed ratio.

CHART 4

| Speed Ratios | 102 | 104 | 106 | 108 | 124 | 122 | 110 | 112 | 114 |
|---|---|---|---|---|---|---|---|---|---|
| 1 | X | | | | X | | 1A | | |
| 2 | | | X | | X | | | 2A | |
| 3 | | X | | | X | | 1B | | |
| 4 | | | | X | X | | | 2B | |
| 5 | X | | | | X | | 1A | | |
| 6 | | X | | | X | | | 2A | |
| 7 | | | X | | X | | 1B | | |
| 8 | | | | X | X | | | 2B | |
| 9 | X | | | | | X | 1A | | |
| 10 | | | X | | | X | | 2A | |
| 11 | | X | | | | X | 1B | | |
| 12 | | | X | | | X | | 2B | |
| 13 | X | | | | | X | 1A | | |
| 14 | | X | | | | X | | 2B | |
| 15 | | X | | | | X | 1A | | |
| 16 | | | X | | | X | | 2B | |
| R1 | | X | | X | | | | | 2R |
| R2 | | | X | X | | | | | 2R |
| R3 | | X | | | | X | | | 2R |
| R4 | | | | X | | X | | | 2R |

For example, to establish first gear, the first clutch 102 and the brake 124 are engaged or activated and the first synchronizer 110 is in the 1A position. Likewise, the reverse gears and the sixteen forward ratios are achieved through different combinations of clutch and brake engagement and synchronizer position, as shown in Chart 4.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
    an input member;
    an output member;
    a first gearing arrangement including a first gear set, a second gear set, a third gear set, a fourth gear set, and a first countershaft, wherein the first gear set, the second gear set, the third gear set, and the fourth gear set are selectively connectable to the first countershaft, and wherein the input member is continuously interconnected with the first gear set and the second gear set;
    a second gearing arrangement including the first gear set, the second gear set, the fourth gear set, a fifth gear set, a sixth gear set, and a second countershaft, wherein the first gear set, the second gear set, the fourth gear set, the fifth gear set, and the sixth gear set are selectively connectable to the second countershaft;
    a planetary gear set having a first member, a second member, and a third member;
    a first interconnecting member continuously interconnected to the third, fourth, fifth, and sixth gear sets and to the first member of the planetary gear set;
    a second interconnecting member continuously interconnected to the third member of the planetary gear set;
    a clutch assembly selectively engageable to interconnect one of the first gear set and the second gear set with one of the first countershaft and the second countershaft;
    three synchronizers for selectively coupling one of the third, fourth, fifth, and sixth gear sets with one of the first and second countershafts;
    three torque-transmitting devices selectively engageable to interconnect one of the input member, first interconnecting member, and second interconnecting member with another of the input member, first interconnecting member, second interconnecting member, and a stationary element; and
    wherein the torque-transmitting devices and synchronizers are selectively engageable in combinations of at least three to establish at least seventeen forward speed ratios and at least four reverse speed ratio between the input member and the output member.

2. The transmission of claim 1 wherein the first countershaft is located radially outward from and parallel to the input member.

3. The transmission of claim 2 wherein the second countershaft is located radially outward from and parallel to the input member.

4. The transmission of claim 1 further comprising a torque converter continuously connected with the input member.

5. The transmission of claim 1 wherein the clutch assembly includes a first clutch for selectively connecting the first gear set with the first countershaft.

6. The transmission of claim 5 wherein the clutch assembly includes a second clutch for selectively connecting the second gear set with the first countershaft.

7. The transmission of claim 6 wherein the clutch assembly includes a third clutch for selectively connecting the first gear set with the second countershaft.

8. The transmission of claim 7 wherein the clutch assembly includes a fourth clutch for selectively connecting the second gear set with the second countershaft.

9. The transmission of claim 1 wherein a first of the three torque-transmitting devices selectively connects the input member with the first interconnecting member.

10. The transmission of claim 9 wherein a second of the three torque-transmitting devices selectively connects the first interconnecting member with the second interconnecting member.

11. The transmission of claim 10 wherein a third of the three torque-transmitting devices selectively connects the third member of the planetary gear set with the stationary element.

12. The transmission of claim 1 wherein a first of the three synchronizers selectively connects one of the third gear set and the fourth gear set to the first countershaft.

13. The transmission of claim 12 wherein a second of the three synchronizers selectively connects one of the fifth gear set and the sixth gear set to the second countershaft.

14. The transmission of claim 13 wherein a third of the three synchronizers selectively connects the fourth gear set to the second countershaft.

15. The transmission of claim 14 wherein the first, second, third, fourth, fifth, and sixth gear sets are co-planar gear sets each including at least a first gear intermeshed with a second gear.

16. The transmission of claim 15 wherein a plurality of the first gears are continuously interconnected with the second interconnecting member and a plurality of the second gears are continuously interconnected with one of the first and second countershafts.

17. The transmission of claim 16 wherein the fourth gear set includes a third gear selectively connectable to the second countershaft, the third gear intermeshed with an idler gear, the idler gear intermeshed with the first gear of the fourth gear set.

18. The transmission of claim 1 wherein the first member of the planetary gear set is a sun gear member, the second member of the planetary gear set is a planet carrier member, and the third member of the planetary gear set is a ring gear member.

19. The transmission of claim 1 wherein the output member is continuously connected to the second member of the planetary gear set.

20. A transmission comprising:
an input member;
an output member;
a first, second, and fourth gear set each having a first gear member, a second gear member, and a third gear member, wherein the input member is continuously interconnected with the first gear member of the first gear set and the first gear member of the second gear set;
a third, fifth, and sixth gear set each having a first gear member and a second gear member;
a first countershaft selectively connectable with the second gear members of the first, second, third, and fourth gear sets;
a second countershaft selectively connectable with the third gear members of the first, second, and fourth gear sets and with the second gear members of the fifth and sixth gear sets;
a planetary gear set having a first member, a second member, and a third member;
a first interconnecting member continuously interconnected to the first members of the third, fourth, fifth, and sixth gear sets and to the first member of the planetary gear set;
a second interconnecting member continuously interconnected to the third member of the planetary gear set;
a clutch assembly selectively engageable to interconnect one of the first gear set and the second gear set with one of the first countershaft and the second countershaft;
three synchronizers for selectively coupling one of the third, fourth, fifth, and sixth gear sets with one of the first and second countershafts;
three torque-transmitting devices selectively engageable to interconnect one of the input member, first interconnecting member, and second interconnecting member with another of the input member, first interconnecting member, second interconnecting member, and a stationary element; and
wherein the torque-transmitting devices and synchronizers are selectively engageable in combinations of at least three to establish at least seventeen forward speed ratios and at least four reverse speed ratio between the input member and the output member.

21. The transmission of claim 20 wherein a first of the three synchronizers selectively connects one of the second gear member of the third gear set and the second gear member of the fourth gear set with the first countershaft, a second of the three synchronizers selectively connects one of the second gear member of the fifth gear set and the second gear member of the sixth gear set to the second countershaft, and a third of the three synchronizers selectively connects the third member of the fourth gear set to the second countershaft.

22. The transmission of claim 20 wherein the clutch assembly includes a first clutch for selectively connecting the second gear member of the first gear set with the first countershaft, a second clutch for selectively connecting the second gear member of the second gear set with the first countershaft, a third clutch for selectively connecting the third gear member of the first gear set with the second countershaft, a fourth clutch for selectively connecting the third gear member of the second gear set with the second countershaft, and wherein a first of the three torque-transmitting devices selectively connects the input member with the first interconnecting member, a second of the three torque-transmitting devices selectively connects the first interconnecting member with the second interconnecting member, and a third of the three torque-transmitting devices selectively connects the third member of the planetary gear set with the stationary element.

23. A transmission comprising:
an input member;
an output member;
a first gearing arrangement including a first gear set, a second gear set, a third gear set, a fourth gear set, and a first countershaft, wherein the first gear set, the second gear set, the third gear set, and the fourth gear set are selectively connectable to the first countershaft, and wherein the input member is continuously interconnected with the first gear set and the second gear set;

a second gearing arrangement including the first gear set, the second gear set, the fourth gear set, a fifth gear set, a sixth gear set, and a second countershaft, wherein the first gear set, the second gear set, the fourth gear set, the fifth gear set, and the sixth gear set are selectively connectable to the second countershaft;

a planetary gear set having a sun gear, a carrier member, and a ring gear;

a first interconnecting member continuously interconnected to the third, fourth, fifth, and sixth gear sets;

a second interconnecting member continuously interconnected to the ring gear of the planetary gear set;

a first clutch for selectively connecting the first gear set with the first countershaft;

a second clutch for selectively connecting the second gear set with the first countershaft;

a third clutch for selectively connecting the first gear set with the second countershaft;

a fourth clutch for selectively connecting the second gear set with the second countershaft;

a fifth clutch for selectively connecting the input member with the first interconnecting member;

a sixth clutch for selectively connecting the first interconnecting member with the second interconnecting member;

a brake for selectively connecting the ring gear of the planetary gear set with a stationary element;

a first synchronizer for selectively connecting one of the third gear set and the fourth gear set to the first countershaft;

a second synchronizer for selectively connecting one of the fifth gear set and the sixth gear set to the second countershaft;

a third synchronizer for selectively connecting the fourth gear set to the second countershaft; and wherein the clutches, brake, and synchronizers are selectively engageable in combinations of at least three to establish at least seventeen forward speed ratios and at least four reverse speed ratio between the input member and the output member.

24. A transmission comprising:

an input member;

an output member;

a first gearing arrangement including a first gear set, a second gear set, a third gear set, a fourth gear set, and a first countershaft, wherein the first gear set, the second gear set, the third gear set, and the fourth gear set are selectively connectable to the first countershaft, and wherein the input member is continuously interconnected with the first gear set and the second gear set;

a second gearing arrangement including the first gear set, the second gear set, the fourth gear set, a fifth gear set, a sixth gear set, and a second countershaft, wherein the first gear set, the second gear set, the fourth gear set, the fifth gear set, and the sixth gear set are selectively connectable to the second countershaft;

a planetary gear set having a first member, a second member, and a third member;

a first interconnecting member continuously interconnected to the third, fourth, fifth, and sixth gear sets and to the first member of the planetary gear set;

a second interconnecting member continuously interconnected to the third member of the planetary gear set;

a clutch assembly selectively engageable to interconnect one of the first gear set and the second gear set with one of the first countershaft and the second countershaft;

three synchronizers for selectively coupling one of the third, fourth, fifth, and sixth gear sets with one of the first and second countershafts;

two torque-transmitting devices selectively engageable to interconnect one of the first interconnecting member and second interconnecting member with another of the first interconnecting member, second interconnecting member, and a stationary element; and wherein the torque-transmitting devices and synchronizers are selectively engageable in combinations of at least three to establish at least sixteen forward speed ratios and at least four reverse speed ratio between the input member and the output member.

25. A transmission comprising:

an input member;

an output member;

a first gearing arrangement including a first gear set, a second gear set, a third gear set, a fourth gear set, and a first countershaft, wherein the first gear set, the second gear set, the third gear set, and the fourth gear set are selectively connectable to the first countershaft, and wherein the input member is continuously interconnected with the first gear set and the second gear set;

a second gearing arrangement including the first gear set, the second gear set, the fourth gear set, a fifth gear set, a sixth gear set, and a second countershaft, wherein the first gear set, the second gear set, the fourth gear set, the fifth gear set, and the sixth gear set are selectively connectable to the second countershaft;

a planetary gear set having a sun gear, a carrier member, and a ring gear, wherein the output member is continuously connected with the carrier member;

a first interconnecting member continuously interconnected to the third, fourth, fifth, and sixth gear sets and to the sun gear of the planetary gear set;

a second interconnecting member continuously interconnected to the ring gear of the planetary gear set;

a first clutch for selectively connecting the first gear set with the first countershaft;

a second clutch for selectively connecting the second gear set with the first countershaft;

a third clutch for selectively connecting the first gear set with the second countershaft;

a fourth clutch for selectively connecting the second gear set with the second countershaft;

a fifth clutch for selectively connecting the first interconnecting member with the second interconnecting member;

a brake for selectively connecting the ring gear of the planetary gear set with a stationary element;

a first synchronizer for selectively connecting one of the third gear set and the fourth gear set to the first countershaft;

a second synchronizer for selectively connecting one of the fifth gear set and the sixth gear set to the second countershaft;

a third synchronizer for selectively connecting the fourth gear set to the second countershaft; and wherein the clutches, brake, and synchronizers are selectively engageable in combinations of at least three to establish at least sixteen forward speed ratios and at least four reverse speed ratio between the input member and the output member.

* * * * *